(12) United States Patent
Yu

(10) Patent No.: US 6,855,651 B2
(45) Date of Patent: Feb. 15, 2005

(54) COVER TAPE

(76) Inventor: Tsai-Yun Yu, No. 1-2, Lane 1147, Sec. 1, Chung San Road, Ta Chia Chen, Taichung Hsien (TW)

( * ) Notice: Subject to any disclaimer, the term of this patent is extended or adjusted under 35 U.S.C. 154(b) by 156 days.

(21) Appl. No.: 09/963,398

(22) Filed: Sep. 27, 2001

(65) Prior Publication Data

US 2003/0027475 A1 Feb. 6, 2003

(30) Foreign Application Priority Data

Jul. 31, 2001 (TW) ........................................ 90212904 U

(51) Int. Cl.$^7$ .............................................. B32B 33/00
(52) U.S. Cl. ..................... 442/149; 74/551.1; 74/551.6; 74/551.9; 74/557; 16/110; 16/407; 16/430; 428/167; 428/182; 428/66.7; 428/99; 428/105; 428/121; 428/354; 428/40.1; 428/41.4; 428/45; 428/60; 428/156; 428/157; 428/163; 442/76; 442/79; 442/80; 442/81; 442/85; 442/86; 442/87; 442/91; 442/97; 442/104; 442/148; 442/150; 442/151; 442/394; 442/399; 442/414
(58) Field of Search .............................. 74/551.1, 551.6, 74/551.9, 557; 428/33, 40.1, 41.4, 45, 60, 66.7, 99, 105, 121, 156, 157, 159, 163, 165, 191, 343, 354, 542.6, 167, 182; 442/76, 79–81, 85, 86, 87, 91, 97, 104, 148, 149, 394, 399, 414; 16/430, 110.1, 407; 473/300, 301, 302, 308; 273/81 R, 75, 73 J, 170, 26 B, 18 D; 206/521, 584; 2/16

(56) References Cited

U.S. PATENT DOCUMENTS

| | | | | |
|---|---|---|---|---|
| 4,476,742 A | * | 10/1984 | Midgley | 74/551.9 |
| 4,953,861 A | * | 9/1990 | Nakanishi | 473/300 |
| 5,088,734 A | | 2/1992 | Glava | |
| 5,851,632 A | * | 12/1998 | Chen et al. | 428/156 |
| 6,342,280 B1 | * | 1/2002 | Patrick et al. | 428/34.6 |

FOREIGN PATENT DOCUMENTS

EP 0 738 525 A2 10/1996

OTHER PUBLICATIONS

"Wilson TL Gel", FOG.IMAGEG.NET, Online XP002255216; Retrieved from Internet: <URL:http://FOG.IMAGEG.NET/Graphics/Product_Images/P462318 REG.JPG>;Retrieved on Sep. 19, 2003.

Wilson Press Release: entitled "Wilson Expands Its Best Selling Line of String and Grips"; Online! XP002255217; Retrieved from Internet: <URL:http://www.SGMA.com/press/2001/press99668527–21348.html>; Retrieved on Sep. 19, 2003.

* cited by examiner

*Primary Examiner*—Arti R. Singh
(74) *Attorney, Agent, or Firm*—Browdy and Neimark, P.L.L.C.

(57) ABSTRACT

A cover tape for winding on a grip of a device comprising an elongated cloth layer and an elastic layer. The cloth layer has a first surface and a second surface. The elastic layer is made of silicone gel and bonded to the first surface of the cloth layer for enabling the second surface of the cloth layer to be exposed to the outside when spirally winding the cover tape round the grip with the elastic layer adhered to the periphery of the grip.

5 Claims, 3 Drawing Sheets

COVER TAPE

FIELD OF THE INVENTION

The present invention relates generally to a grip of a device, and more particularly to a cover tape wound on the grip of the device, which is shockproof comfortable and positive to grasp, and inexpensive to manufacture.

BACKGROUND OF THE INVENTION

The conventional grips of devices such as the grips of the handlebar of a bicycle and the grips of tennis or badminton rackets are commonly spirally wound round with a cover tape for comfortable grasping. Most of the conventional cover tapes have a contact surface made of PU (polyurethane). Such a contact surface is always smooth and does not absorb sweat. Accordingly, such a conventional grip tends to slip from the user's hand when the cover tape is wetted after a long time use. In order to eliminate this problem, the contact surface was roughened by grinding or was embossed by pressure. However, this processing process degrades the structural strength of the PU cover tape, and lowers the elastic material property and shock absorbing ability of the PU cover tape. Further., because the PU cover tape is adhered to the periphery of the grip by means of glue or double-sided adhesive, it tends to be forced out place after long use. Furthermore, because conventional cover tapes for device grip are generally comprised of multiple layers bonded to one another and the surface must be secondarily processed after bonding of the multiple layers, the manufacturing cost of conventional cover tapes for device grip is high.

SUMMARY OF THE INVENTION

It is therefore the primary objective of the present invention to provide a cover tape for winding on the grip of a device, which is shockproof, comfortable, and positive to grasp.

It is another objective of the present invention to provide a cover tape for winding on the grip of a device, which can be adhered to the grip firmly.

It is still another objective of the present invention to provide a cover tape for winding on the grip of a device, which is simple in construction and is inexpensive to manufacture.

To achieve these objectives, the cover tape of the present invention comprises an elongated cloth layer having a first surface and a second surface, and an elastic layer made of silicone gel and bonded to the first surface of the cloth layer for enabling the second surface of the cloth layer to be exposed to the outside when spirally winding the cover tape round a grip of a device with the elastic layer adhered to the periphery of the grip.

DETAILED DESCRIPTION OF THE INVENTION

Figure 1:
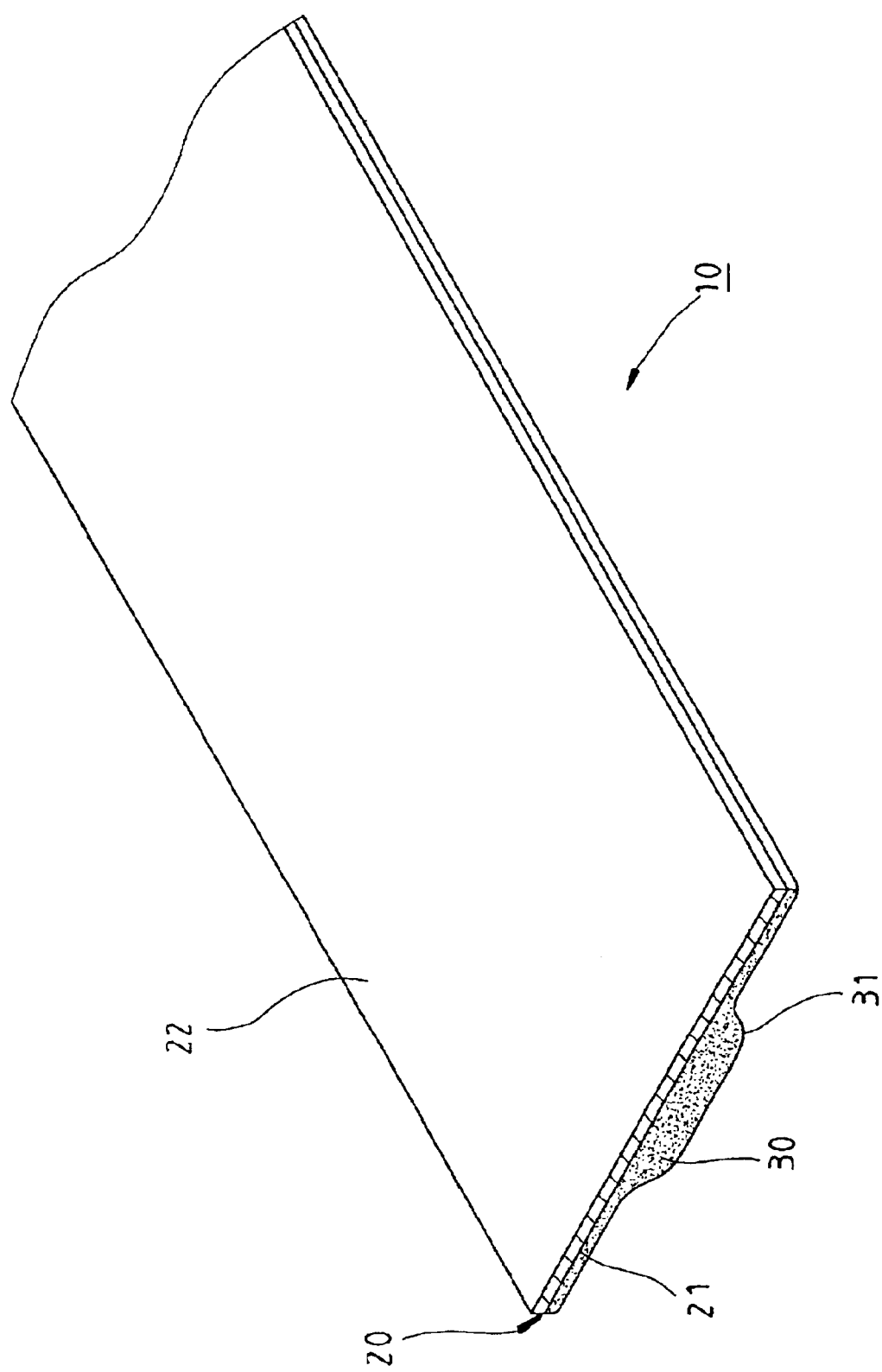
FIG. 1 is a schematic drawing showing the structure of a cover tape constructed according to a first preferred embodiment of the present invention.

As shown in FIG. 1, a cover tape 10 of the first preferred embodiment of the present invention comprises an elongated, thin, film-like cloth layer 20 having a first surface 21 and a second surface 22, and an elastic layer 30 covering the whole area of the first surface 21 of the cloth layer 20. The cloth layer 20 can be obtained from fabric or nonwoven fabric. According to this embodiment, the cloth layer 20 is obtained from non-woven fabric, having a thickness about 0.6 mm and a plurality of open pores in between the fibers thereof (not shown). Because of the effect of the open pores in between the fibers, the cloth layer 20 admits air, and can retain water. The elastic layer 30 is made of silicone gel for the advantages of high elasticity and high viscosity. During bonding, the sticky power of silicone gel enables the elastic layer 30 to be well adhered to the first surface 21 of the cloth layer 20 without the use of glue. The elastic layer 30 has a rib 31 longitudinally extended in the middle portion of the elastic layer. The width of the rib 31 is about ⅓ of the short axis of the cloth layer 20. The thickness of the rib 31 is two times of the thickness of the cloth layer 20, i.e., about 1.2 mm. This arrangement enables the cover tape 10 to have a satisfactory shock absorbing ability.

When making the cover tape 10, a long sheet of cloth, i.e. the cloth layer 20, is carried forwards on a conveyer belt, and molten silicone gel is applied to the top surface, namely, the first surface 21 of the cloth layer 20 by means of a silicone gel applicator suspended above the conveyer belt at a fixed point. Therefore, the top surface of the cloth layer 20 is evenly coated with a layer of silicone gel of a certain thickness. Further, a mold is provided in front of the silicone gel applicator that have a longitudinally centrally recessed bottom molding surface adapted to mold the applied silicone gel into the desired rib 30. When passing over the bottom side of the mold, the applied silicone gel is shaped to provide the desired rib 30. At the same time, the applied silicone gel, due to capillary effect, penetrates the open pores in between the fibers of the cloth layer 20. After cooled down, the silicone gel is directly bonded to the cloth layer 20, forming the desired elastic layer 30.

Figure 2:
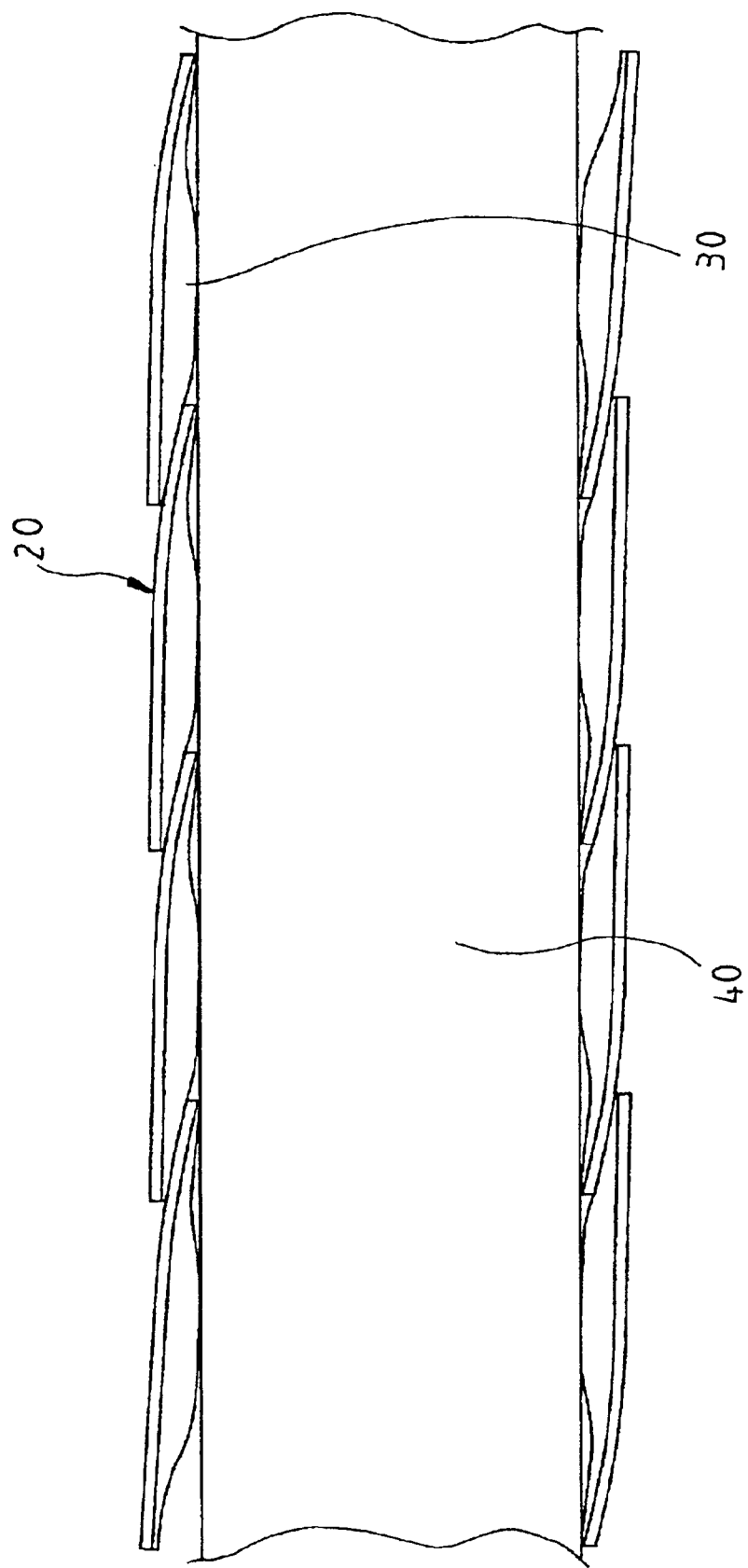
FIG. 2 is a sectional view showing the cover tape wound round a grip according to the present invention.

The cover tape 10 can be used to cover the grips of a bicycle, the grip of a tennis racket or badminton racket, or the grip of a golf club. FIG. 2 shows an application example of the present invention. As illustrated in FIG. 2, a bonding material (glue or double-sided adhesive) is applied to the periphery of the grip 40 or the inner side of the cover tape 10 (the surface of the elastic layer 30), and then the cover tape 10 is spirally wound round the grip 40 with the elastic layer 30 attached to the periphery of the grip 40 and the second surface 22 of the cloth layer 20 exposed to the outside. When winding, each two adjacent turns of the cover tape 10 are peripherally overlapped with each other such that the cover tape 10 provides a uniform thickness on the grip 40 after winding.

The aforesaid cover tape 10 achieves the following advantages.

1. Because the elastic layer 30 is made of silicone gel, the cover tape 10 is comfortable to grasp and, provides a good shock absorbing function. Because the cloth 20 layer admits air and absorbs sweat, the cover tape 10 does not slip from the hand.
2. Because the elastic layer 30 of the cover tape 10 is made of silicone gel and adhered to the periphery of the grip 40 by means of glue or double-sided adhesive, the bonding strength between the cover tape 10 and the grip 40 is high so as to prevent the cover tape 10 to untwist from the grip 40.
3. Because the cover tape 10 is made by directly coating the elastic layer 30 to the cloth layer 20, the fabrication of the cover tape 10 is simple and inexpensive.

Figure 3:
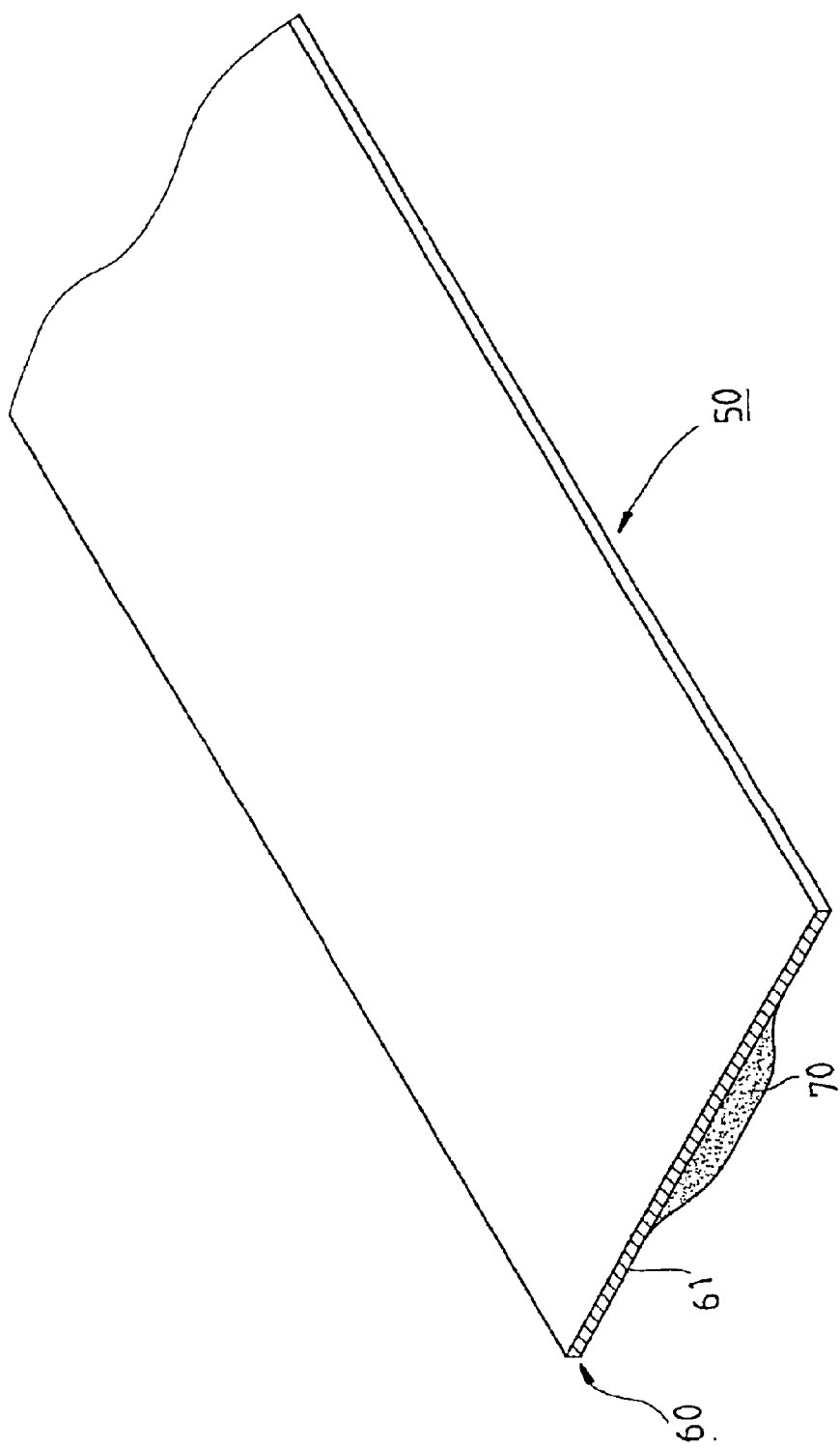
FIG. 3 is a schematic drawing showing the structure of a cover tape constructed according to a second preferred embodiment of the present invention.

FIG. 3 shows a second preferred embodiment of the present invention. According to this embodiment, a cover tape 50 is comprised of a cloth layer 60 and an elastic layer of silicone gel 70 bonded to a first surface 61 of the cloth layer 60. Unlike the aforesaid first preferred embodiment of the present invention, the elastic layer 70 covers a middle part about one third of the width of the cloth layer 60, i.e., the two edges of the first surface of the cloth layer 60 are bare. When spirally winding round the grip, the bare portions of the first surface 61 of the cloth layer 60 are overlapped, keeping the installed cover tape 50 in a uniform thickness on the grip.

What is claimed is:

1. A cover tape adapted to wind around a grip, said cover tape comprising:

an elongated cloth layer formed from a non-woven fabric having a first surface and a second surface; and an elastic layer made of silicone gel bonded by the sticky power of silicone gel to the first surface of said cloth; the second surface of said cloth layer being exposed to the outside; wherein the cover tape is spirally wound around the grip with said elastic layer bonded directly to the periphery of the grip.

2. The cover tape as defined in claim 1, wherein said elastic layer covers the entire area of said first surface of said cloth layer.

3. The cover tape as defined in claim 2, wherein said elastic layer has only a single rib extending along the direction of the longitudinal axis of said cloth layer and disposed at a middle portion of said elastic layer.

4. The cover tape as defined in claim 1, wherein said elastic layer covers a middle part of the first surface of said cloth and extends in direction along the longitudinal axis of said cloth layer.

5. The cover tape as defined in claim 1, wherein said elastic layer has a thickness about two times of the thickness of said cloth layer.

\* \* \* \* \*